United States Patent Office 3,832,299
Patented Aug. 27, 1974

3,832,299
GAS DETECTING ELECTRODE ASSEMBLY
Imanuel Bergman, Sheffield, England, assignor to National Research-Development Corporation, London, England
Continuation of abandoned application Ser. No. 839,887, July 8, 1969. This application Mar. 30, 1972, Ser. No. 239,440
Claims priority, application Great Britain, July 18, 1968, 34,237/68
Int. Cl. G01n 27/30, 27/46
U.S. Cl. 204—195 P                    9 Claims

ABSTRACT OF THE DISCLOSURE

An electrical cell with a non-porous gas-permeable membrane having a large surface area for forming an interface with a liquid containing a dissolved gas communicating with a membrane electrode, whose effective area is small when compared with the surface area of the gas-permeable membrane, so that gas can pass from the membrane to the electrode.

---

Figure 1:
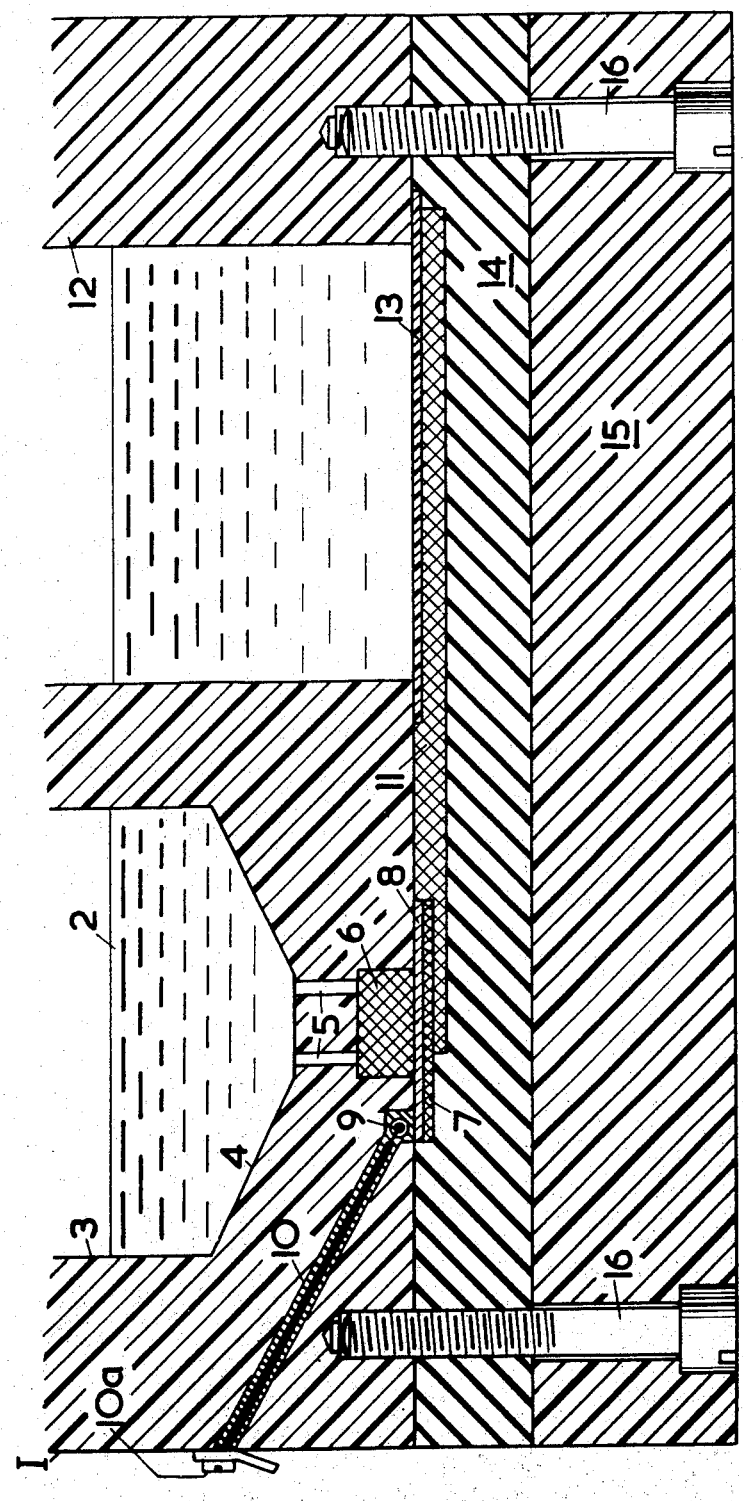

This is a continuation of application Ser. No. 839,887 filed July 8, 1969, now abandoned.

The present invention relates to an electrical cell, as for example, a polarographic cell, voltaic half-cell and fuel cell.

Membrane electrodes have been used in instruments for detecting oxygen in gases. In these cases, the oxygen will diffuse through the membrane to a film of electrically conducting material which may constitute the cathode of a polarographic electrical cell. The diffusion of oxygen produces a depolarisation effect on the surface of the layer or film of electrically conducting material to control the magnitude of an electric current according to the rate at which this diffused oxygen reaches the cathode and hence upon the partial pressure of the oxygen in the atmosphere.

Numerous electrodes have been devised for the measurement of oxygen dissolved in unstirred liquids such as water or other liquids of comparable or great viscosity. These electrodes give unreliable results due to a stagnant layer of liquid near the electrode which becomes depleted of oxygen by the reduction at the electrode. Other devices are based on very small electrode surfaces and on membranes which are relatively impermeable to oxygen. These electrodes give very low currents.

One object of the invention is to provide within a cell an electrode assembly for use in measuring the oxygen tension or other specific gas tension in an unstirred liquid such as water or other liquids of comparable or greater viscosity. The expression tension in this specification refers to the partial pressure of the oxygen or other specific gas in the dissolved gas.

According to the invention, there is provided an electrical cell comprising a non-porous gas-permeable membrane having a large surface area for forming an interface with a liquid containing a dissolved gas, a membrane electrode whose effective area is small when compared with the surface area of the gas-permeable membrane, the said membrane and the said electrode communicating with each other so that gas can pass from the membrane to the electrode. Preferably the membranes comprising the membrane electrode and the gas-permeable membrane are similar.

Preferably the gas permeability of the gas-permeable membrane is not less than the gas permeability of the membrane electrode. The oxygen diffusing through the membrane at the interface with the fluid is thus conveyed in the gas phase to a much smaller gas/membrane electrode interface. If the oxygen consumption of this latter electrode were derived directly from a fluid, the surface layer would be rapidly depleted of oxygen. With the present device this oxygen-consumption is spread over the larger fluid interface and the depletion is minimized.

The electrode may consist of a metallized membrane as described in copending application Ser. No. 746,436, now U.S. Pat. 3,668,101, having a metallized layer and a protective membrane. Alternatively, the electrode may consist of any standard electrode used in polarographic cells for instance the Clark electrode (ref. L. C. Clark, Jn., Trans. Amer. Soc. Artif. Intern. Organs, 1956, 2, 41). One form of the non-porous, oxygen permeable membrane in contact with the liquid under test uses polytetrafluoroethylene (PTFE), polyethylene, silicone or other rubber of thickness of about 3 microns to about 100 microns.

Preferably when a metallized membrane is incorporated in a cell, its surface in contact with an electrolyte, for instance sodium chloride solution, is protected from damage by the provision of a protective layer of a material permeable to the electrolyte but relatively less permeable to gases, such as a dialysis membrane, as described in U.S. Pat. 3,668,101, referred to above.

The invention will now be described, by way of example with reference to FIGS. 1 to 5 filed with the provisional specification and FIG. 6 filed with the present specification.

Figure 2:
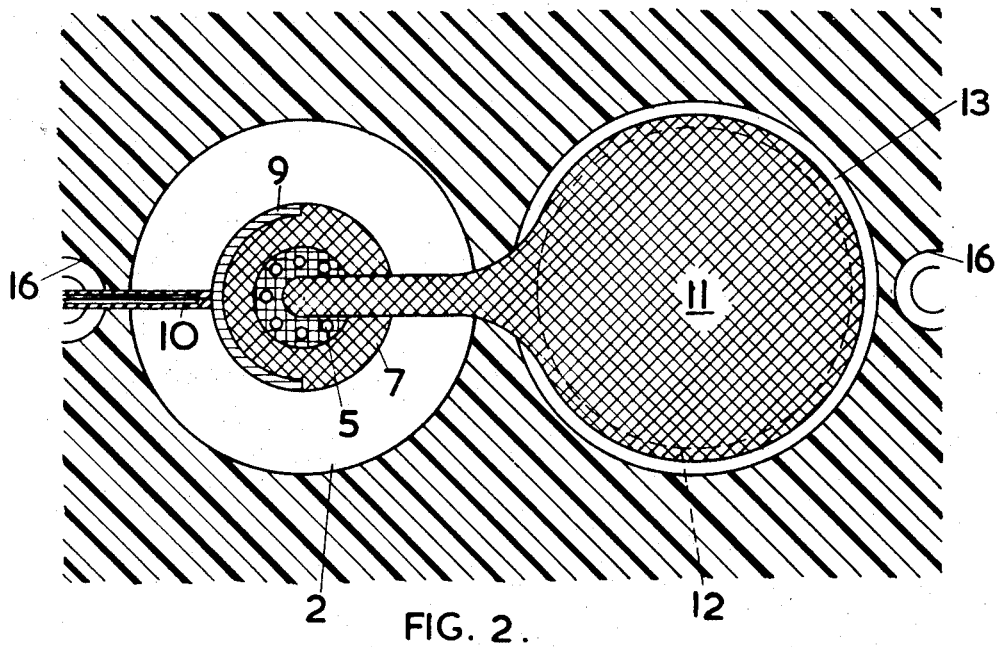
Figure 3:
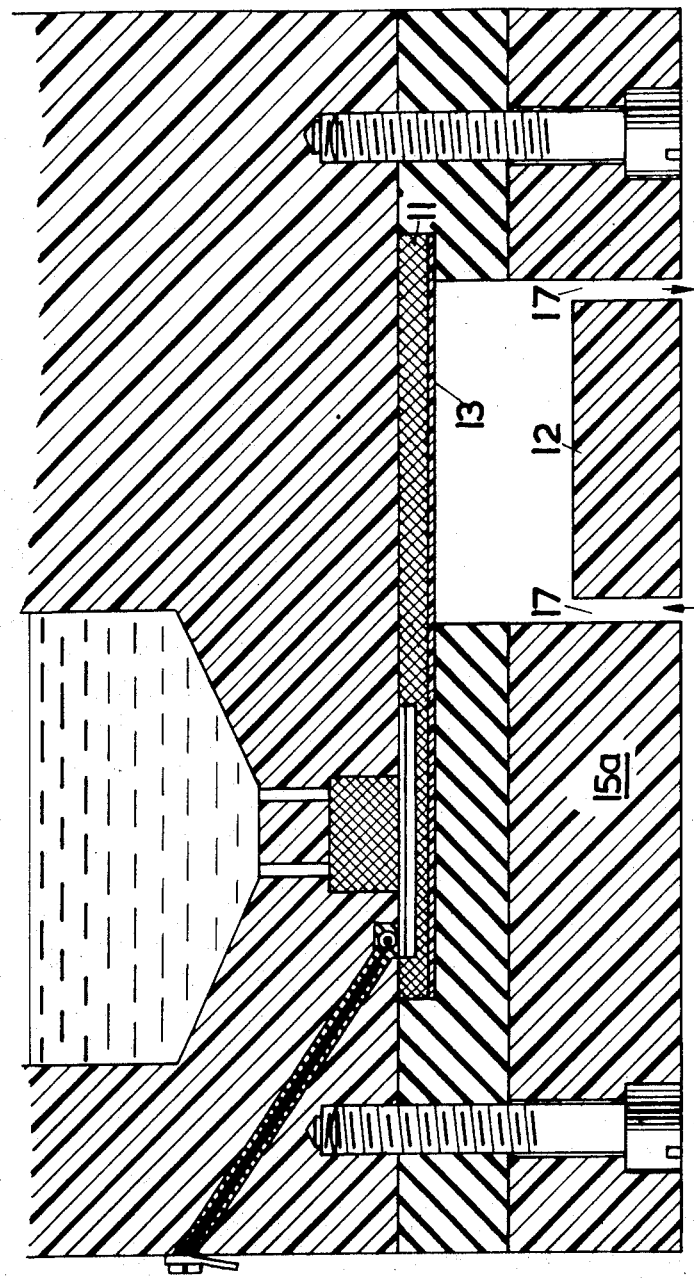
Figure 4:
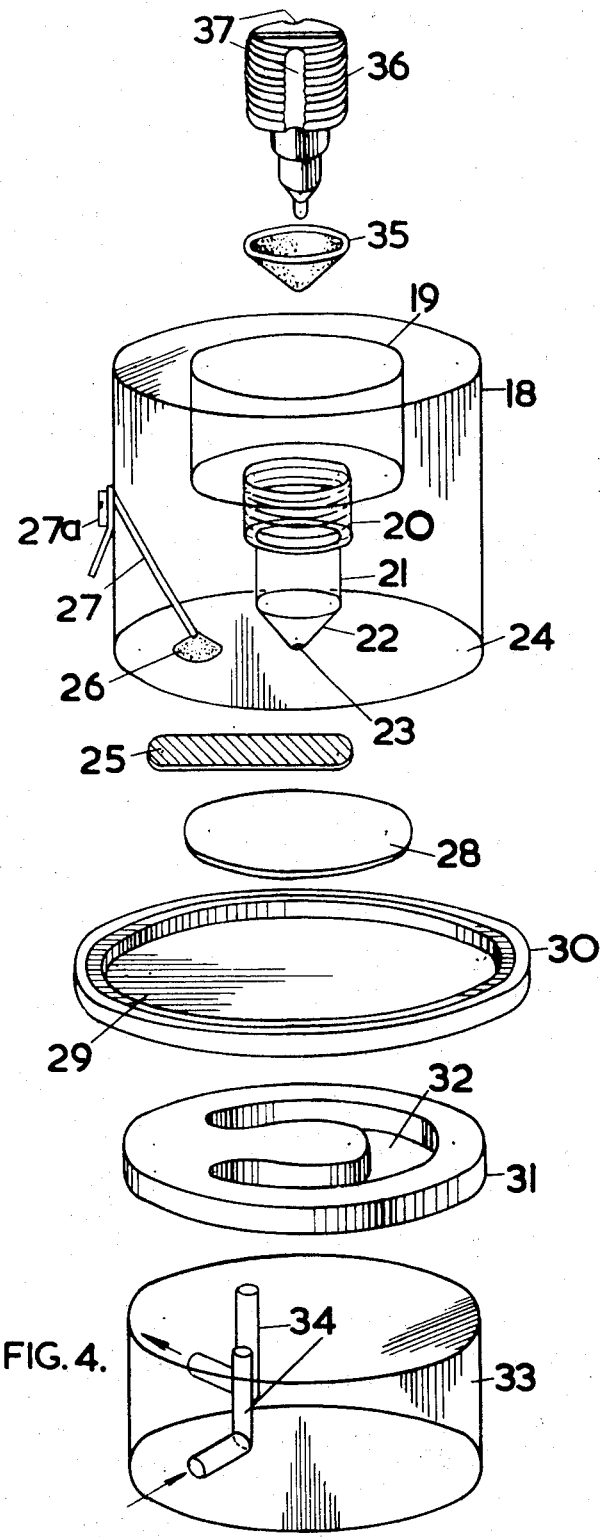
Figure 5:
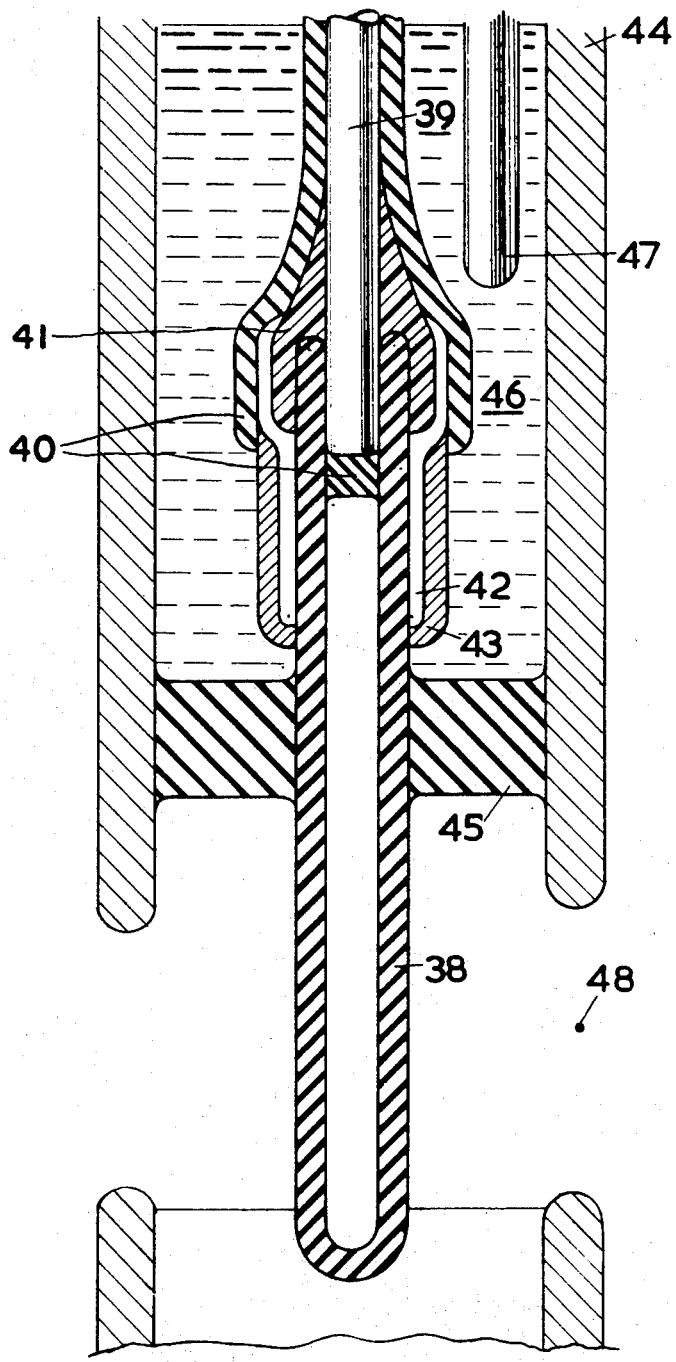

In the drawings:
FIG. 1 is a sectional view of a polarographic cell according to the invention.
FIG. 2 is a diagrammatic plan view of the same cell.
FIG. 3 is a sectional view showing a modification.
FIG. 4 is an exploded view of a further modification of a polarographic cell.
FIG. 5 is an adaption of the cell for use in a catheter or as a needle electrode.
FIG. 6 is a further adaption of the cell for use in a catheter.

The polarographic cell shown in FIG. 1 comprises a cylindrical body I containing an electrolyte 2 contained in a chamber 3, this chamber having a tapered portion 4 at its lower end leading to a plurality of passages 5. That part of the body I immediately in contact with the passages 5 is bored to receive a dialysis membrane 6. The lower face of the dialysis membrane 6 is in contact with a metallized membrane 7. The metallized layer 8 of the membrane 7 is in electrical contact with a contact ring 9, which ring is connected by an insulated wire 10 to a terminal 10a located on the outer wall of the cylindrical body I. The lower surface of the metallized membrane 7 is in face to face contact with an elongated porous membrane filter 11. A further chamber 12 in the cylindrical body I contains the liquid under test. This chamber 12 is sealed at its lower end by a PTFE membrane 13 and the reverse side of the PTFE membrane is in face to face contact with the elongated membrane filter 11. The membrane filter 11 and the assembly of the cell is held in position and supported by a Viton (Trade Mark) rubber gasket 14 and this gasket is clamped by a disc 15 held in position by screws 16.

FIG. 2 gives a diagrammatic plan view of the polarographic cell shown in FIG. 1.

An alternative construction of a polarographic cell according to the invention is shown in FIG. 3 in which the liquid container 12 is situated in the disc 15a. Passages 17 from the base of the disc are connected to this liquid container. Liquid in the container 12 is in contact with and sealed by one face of a PTFE membrane 13, the reverse face of which is in face to face contact with and supports the membrane filter 11.

FIG. 4 shows a modification of the cell to ensure a quick response. The cell comprises a cylindrical body 18 containing a chamber 19 communicating with a threaded bore 20 at the lower end of which is a further chamber 21. Chamber 21 has at its lower end a tapered portion 22 which provides a channel 23 through the base 24 of the body 18. A metallized membrane 25 is held in face to face contact with the base 24, the outlet of the channel 24 and a silver/Araldite (Trade Mark) contact area 26. Contact area 26 is connected by an insulated wire 27 to a terminal 27a located on the outer wall of the cylindrical body 18. A membrane filter or cigarette paper 28 is held in face to face contact with the metallized membrane 25 and is supported by a silicone rubber membrane 29 stretched over a ring 30. The lower surface of the silicone rubber membrane 29 is in contact with a Viton (Trade Mark) rubber gasket 31 containing a cut-out channel 32. The gasket 31 is supported on its lower side by a cylindrical body 33 containing passage-ways 34 leading to each end of channel 32 for the entry and exit of gas or liquid feeds. A conical dialysis membrane 35 is held in the tapered portion 22 by the stem of a threaded plug 36 screwed into chamber 20, the threaded plug 36 containing channels 37 for the supply of an electrolyte held in chamber 19. The whole cell is held together by clamping means (not shown).

In this modification, the gas diffusion path through the very thin membrane filter or cigarette paper is short and sluggishness is minimised.

FIG. 5 shows an adaption of the cell for use in a catheter or as a needle electrode. The cell consists of a thin-silicone rubber tube containing air 38 sealed at its lower end. A silver wire 39 is recessed into the upper end of the tube 38, sealed internally by an insulating cement 40 and externally by a silver filled epoxy resin 41 and contacts a cathode. The outer surface of the resin 41 and the silver wire 39 is surrounded by an insulating cement 40. The cathode 42, consists of a layer of evaporated silver on the upper outer surface of the tube 38 and is protected by a collodion salt bridge layer 43. The cell is secured inside a catheter tube 44 of maximum external diameter 3 mm. by a ring of cement 45 so that the tube 44 is divided into two compartments. The upper compartment contains a saline electrolyte 46 and silver wire anode 47. The lower compartment contains an opening 48 in the wall of the tube 44 to allow the ingress of the liquid under test such as blood or other biological fluid.

For use as a catheter, tube 38 should preferably be closed at its lower end and consist of a plastic material. In this case two openings 48 should be provided in the wall of the tube 44.

Figure 6:
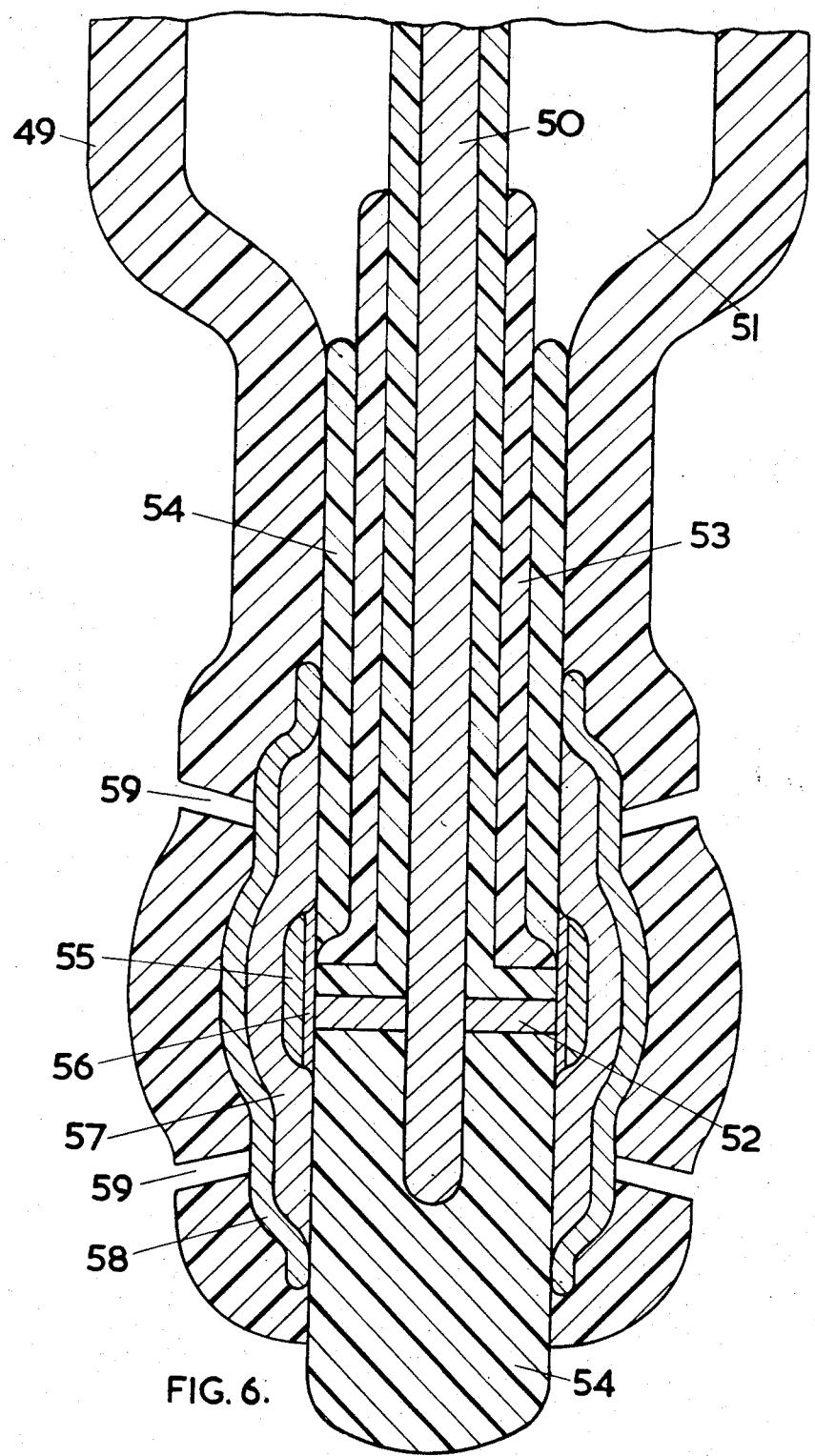

FIG. 6 shows an adaption of the cell for use as a catheter of maximum diameter about 3 mm. The catheter consists of a cylindrical body 49 of a insulating material, containing an insulated silver contact wire 50, and an annular space 51 containing a saline electrolyte and a silver/silver chloride counter electrode (not shown). A circular disc 52 made from silver is rigidly attached to the wire 50 near to its lower end. The circular disc 52 is insulated except for its outer edge. The insulation 54 is built up on the lower end of the wire 50 below the disc 52 until it is flush with the edge of the disc 52 to give a central cylinder to which the outer insulating cylinder 49 can be shrunk to give a good seal. The upper surface of the disc 52 and a section of the wire 50 is coated with a collodion layer 53 and a further layer of insulation 54 surrounds the collodion layer on the wire so that the outer surface of the insulation 54, a small area of collodion 53 and the end face of the disc 52 are substantially co-planar. An annular membrane electrode 55 consisting of a mixture of silver and gold 56 deposited on a PTFE membrane surrounds the outer surface of the disc 52, so that the disc, an area of collodion 53 and the deposited metal 56 are in contact. The metallised membrane 55 is covered by a PTFE membrane filter 57 which in turn is covered by a thin oxygen-permeable silicone membrane 58. The insulating material 49 which surrounds the lower section of the wire 50 and membrane assembly is heat shrunk to form a seal with the insulation 54, the silicone membrane 58 and the insulated lower end of the wire 50. A plurality of apertures 59 are made in the heat shrunk insulating material 49 around its circumference in two different vertical planes to allow a fluid external to the catheter to communicate directly with the silicone membrane 58.

What I claim is:

1. An electrode assembly for use in a cell for detecting a gas dissolved in a liquid, said assembly comprising:
    (1) a container for an electrolyte;
    (2) means defining a totally enclosed space separate from the interior of said container, said means including,
        (a) a first non-porous gas-permeable membrane area which constitutes a partition between said enclosed space and the interior of said container, and
        (b) a second non-porous gas-permeable membrane area having one face which provides part of the boundary of said enclosed space and another face which is exposed for contact with a liquid under test, whereby gas dissolved in the liquid can diffuse through said second membrane area into said enclosed space and pass through said enclosed space to said first membrane area, and
    (3) an electrode arranged for contact with electrolyte held in said container and having a portion of its surface disposed in close proximity to said first membrane area to intercept gas diffusing through said first membrane area from said enclosed space, the surface area of said portion of the electrode surface being less than the surface area of said second membrane area which is available for the diffusion of gas therethrough.

2. An electrode assembly according to claim 1, wherein said first and second membrane areas comprise portions of the same membrane.

3. An electrode assembly according to claim 1 wherein said first and second membrane areas are separate and distinct membranes.

4. An electrode assembly according to claim 1, wherein said enclosed space separate from the interior of the container is at least partially filled with a porous support means.

5. An electrode assembly according to claim 1, in which said electrode is constituted by part of a metallized layer on said first membrane area.

6. An electrode assembly according to claim 1, in which the gas permeability of said second membrane area is not less than the gas permeability of said first membrane area.

7. An electrode assembly for use in a cell for detecting a gas dissolved in a liquid, said assembly comprising:
    (1) a container for an electrolyte;
    (2) membrane means defining a totally enclosed space separate from the interior of said container, said means including,
        (a) a first non-porous gas-permeable area of said membrane which constitutes a partition between said enclosed space and the interior of said container, and
        (b) a second non-porous gas-permeable area of said membrane having one face which provides part of the boundary of said enclosed space and another face which is exposed for contact with a liquid under test, whereby gas dissolved in the liquid can diffuse through said second membrane area into said enclosed space to said first membrane area, and (3) a pair of electrodes one of which is arranged for contact with electrolyte held in said container and having a portion of its surface disposed in close proximity to said first membrane area to intercept gas diffusing through said first membrane area from said enclosed space, the surface area of said first membrane area portion being less than the surface area of said second membrane area portion which is available for the diffusion of gas therethrough.

8. An electrode assembly according to claim 7, in which the gas permeability of said second membrane area is not less than the gas permeability of said first membrane area.

9. An electrode assembly according to claim 7, in which one of said electrodes is constituted by part of a metallized layer on said first membrane.

References Cited

UNITED STATES PATENTS

| | | | |
|---|---|---|---|
| 3,239,444 | 3/1966 | Heldenbrand | 204—195 P |
| 3,098,813 | 7/1963 | Beebe et al. | 204—195 P |
| 3,278,408 | 10/1966 | Leonard et al. | 204—195 P |
| 3,528,403 | 9/1970 | Imredy et al. | 204—195 P X |

OTHER REFERENCES

Leland C. Clark, Jr. et al., Ann. N.Y. Acad. Sci., vol. 102, art. 1, pp. 39–41 (1963).

GERALD L. KAPLAN, Primary Examiner

U.S. Cl. X.R.

128—2 E